United States Patent
Venkatesh

(10) Patent No.: US 9,401,818 B2
(45) Date of Patent: Jul. 26, 2016

(54) SCALABLE GATEWAYS FOR A FABRIC SWITCH

(71) Applicant: BROCADE COMMUNICATIONS SYSTEMS, INC., San Jose, CA (US)

(72) Inventor: Vardarajan Venkatesh, Santa Clara, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 155 days.

(21) Appl. No.: 14/215,996

(22) Filed: Mar. 17, 2014

(65) Prior Publication Data

US 2014/0269733 A1 Sep. 18, 2014

Related U.S. Application Data

(60) Provisional application No. 61/794,057, filed on Mar. 15, 2013.

(51) Int. Cl.
*H04L 12/46* (2006.01)
*H04L 12/931* (2013.01)
*H04L 29/08* (2006.01)

(52) U.S. Cl.
CPC ........ *H04L 12/4641* (2013.01); *H04L 12/4633* (2013.01); *H04L 49/356* (2013.01); *H04L 67/1097* (2013.01)

(58) Field of Classification Search
None
See application file for complete search history.

(56) References Cited

U.S. PATENT DOCUMENTS

| | | |
|---|---|---|
| 829,529 A | 8/1906 | Keathley |
| 5,390,173 A | 2/1995 | Spinney |
| 5,802,278 A | 9/1998 | Isfeld |
| 5,878,232 A | 3/1999 | Marimuthu |
| 5,959,968 A | 9/1999 | Chin |
| 5,973,278 A | 10/1999 | Wehrli, III |
| 5,983,278 A | 11/1999 | Chong |
| 6,041,042 A | 3/2000 | Bussiere |
| 6,085,238 A | 7/2000 | Yuasa |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

Mahalingam "VXLAN: A Framework for Overlaying Virtualized Layer 2 Networks over Layer 3 Networks" Oct. 17, 2013 pp. 1-22, Sections 1, 4 and 4.1.

(Continued)

*Primary Examiner* — Benjamin H Elliot, IV
(74) *Attorney, Agent, or Firm* — Shun Yao; Park, Vaughan, Fleming & Dowler LLP

(57) ABSTRACT

One embodiment of the present invention provides a switch. The switch includes a gateway subgroup module, a tunnel management module, and a packet processor. The gateway subgroup module operates the switch in conjunction with a remote switch to form a gateway subgroup. The switch and the remote switch actively operate as tunnel gateways. The tunnel management module maintains a data structure indicating whether a tunnel source subnet is associated with the gateway subgroup. The packet processor decapsulates a tunnel-encapsulated packet in response to a tunnel source subnet of the tunnel-encapsulated packet being associated with the gateway subgroup.

25 Claims, 12 Drawing Sheets

(56) References Cited

U.S. PATENT DOCUMENTS

| | | |
|---|---|---|
| 6,104,696 A | 8/2000 | Kadambi |
| 6,185,214 B1 | 2/2001 | Schwartz |
| 6,185,241 B1 | 2/2001 | Sun |
| 6,438,106 B1 | 8/2002 | Pillar |
| 6,498,781 B1 | 12/2002 | Bass |
| 6,542,266 B1 | 4/2003 | Phillips |
| 6,633,761 B1 | 10/2003 | Singhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,035 B2 | 9/2011 | Mitchell |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha et al. |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,937,865 B1 | 1/2015 | Kumar |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0034292 A1 | 2/2006 | Wakayama |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |

(56) References Cited

U.S. PATENT DOCUMENTS

| | | |
|---|---|---|
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida Ruah |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanda |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |

(56) References Cited

U.S. PATENT DOCUMENTS

| | | |
|---|---|---|
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033669 A1 | 2/2012 | Mohandas |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2013/0301642 A1 | 11/2013 | Radhakrishnan |
| 2014/0044126 A1 | 2/2014 | Sabhanatarajan |
| 2014/0105034 A1 | 4/2014 | Sun |

FOREIGN PATENT DOCUMENTS

| | | |
|---|---|---|
| EP | 1398920 A2 | 3/2004 |
| EP | 2001167 A1 | 8/2007 |
| EP | 1916807 A2 | 4/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
'Switched Virtual Networks. Internetworking Moves Beyond Bridges and Routers' Data Communications, McGraw Hill. New York, US, vol. 23, No. 12, Sep. 1, 1994, pp. 66-70,72,74, XP000462385 ISSN: 0363-6399.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.

(56) References Cited

OTHER PUBLICATIONS

Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'The Effortless Network: Hyperedge Technology for the Campus LAN' 2012.
Brocade 'An Introduction to Brocade VCS Fabric Technology', Dec. 3, 2012.

Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004, pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998, XP002135272 Retrieved from the Internet: URL:ftp://ftp.isi.edu/in-notes/rfc2338.txt [retrieved on Apr. 10, 2000].
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/087,239, filed Apr. 14, 2011, dated May 22, 2013.
Office Action for U.S. Appl. No. 13/092,724, filed Apr. 22, 2011, dated Jul. 16, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 and IPv6', Internet Engineering Task Force, Mar. 2010.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,752, filed Apr. 22, 2011.
BROCADE, 'FastIron and TurboIron 24x Configuration Guide', Feb. 16, 2010.
BROCADE 'Brocade Unveils 'The Effortless Network'', http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.

(56) References Cited

OTHER PUBLICATIONS

Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No., 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
'RBridges: Base Protocol Specification', IETF Draft, Perlman et al., Jun. 26, 2009.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.

(56) References Cited

OTHER PUBLICATIONS

Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/425,238, filed Mar. 20, 2012, dated Mar. 12, 2015.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.

SCALABLE GATEWAYS FOR A FABRIC SWITCH

RELATED APPLICATIONS

This application claims the benefit of U.S. Provisional Application No. 61/794,057, titled "Scalable Distributed Tunnel Gateway for Fabric Switch," by inventor Vardarajan Venkatesh, filed 15 Mar. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011; U.S. patent application Ser. No. 13/801,858, titled "Overlay Tunnel in a Fabric Switch," by inventor Phanidhar Koganti, filed 13 Mar. 2013; and U.S. patent application Ser. No. 13/312,903, titled "Layer-3 Support in TRILL Networks," by inventors Phanidhar Koganti, Anoop Ghanwani, Suresh Vobbilisetty, Rajiv Krishnamurthy, Nagarajan Venkatesan, and Shunjia Yu, filed 6 Dec. 2011, the disclosures of which are incorporated by reference herein.

BACKGROUND

1. Field

The present disclosure relates to communication networks. More specifically, the present disclosure relates to tunnel management in a fabric switch.

2. Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as awareness of virtual machine migration, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic is becoming more diverse, virtual computing in a network is becoming progressively more important as a value proposition for network architects. In addition, the evolution of virtual computing has placed additional requirements on the network. For example, as the locations of virtual servers become more dynamic, it is often desirable that the network infrastructure can efficiently support the virtual servers.

While a fabric switch brings many desirable features to a network, some issues remain unsolved in facilitating efficient tunnel support for a large number of virtual servers.

SUMMARY

One embodiment of the present invention provides a switch. The switch includes a gateway subgroup module, a tunnel management module, and a packet processor. The gateway subgroup module operates the switch in conjunction with a remote switch to form a gateway subgroup. The switch and the remote switch actively operate as tunnel gateways. The tunnel management module maintains a data structure indicating whether a tunnel source subnet is associated with the gateway subgroup. The packet processor decapsulates a tunnel-encapsulated packet in response to a tunnel source subnet of the tunnel-encapsulated packet being associated with the gateway subgroup.

In a variation on this embodiment, the tunnel management module is precluded from decapsulating the tunnel-encapsulated packet in response to the tunnel source subnet of the tunnel-encapsulated packet not being associated with the gateway subgroup.

In a variation on this embodiment, the switch also includes a handover module which determines an egress port corresponding to a gateway switch. The gateway switch is in a second gateway subgroup associated with the tunnel source subnet of the tunnel-encapsulated packet.

In a variation on this embodiment, the switch and the remote switch operate as a virtual gateway, wherein the tunnel destination of the tunnel-encapsulated packet corresponds to the virtual gateway.

In a variation on this embodiment, the packet processor identifies a virtual switch identifier in a packet as a local identifier. This virtual switch identifier is associated with a virtual switch.

In a variation on this embodiment, the packet processor decapsulates tunnel encapsulation of the tunnel-encapsulated packet. This tunnel-encapsulated packet is further encapsulated in a second encapsulation.

In a variation on this embodiment, the switch also includes a multi-destination management module which operates the switch as a designated forwarder of the gateway subgroup. A designated forwarder forwards a multi-destination packet via edge ports of a switch.

In a variation on this embodiment, the switch also includes a multi-destination management module which operates the switch as a designated forwarder of a gateway instance. A gateway instance represents a gateway and includes one or more gateway subgroups.

In a variation on this embodiment, the switch and the remote switch operate as a virtual gateway for the gateway instance. A gateway instance is associated with a virtual gateway.

In a variation on this embodiment, the switch also includes a fabric switch management module which maintains a membership in a fabric switch. The fabric switch is configured to accommodate a plurality of switches and operates as a single switch.

BRIEF DESCRIPTION OF THE FIGURES

In the figures, like reference numerals refer to the same figure elements.

DETAILED DESCRIPTION

Figure 1A:
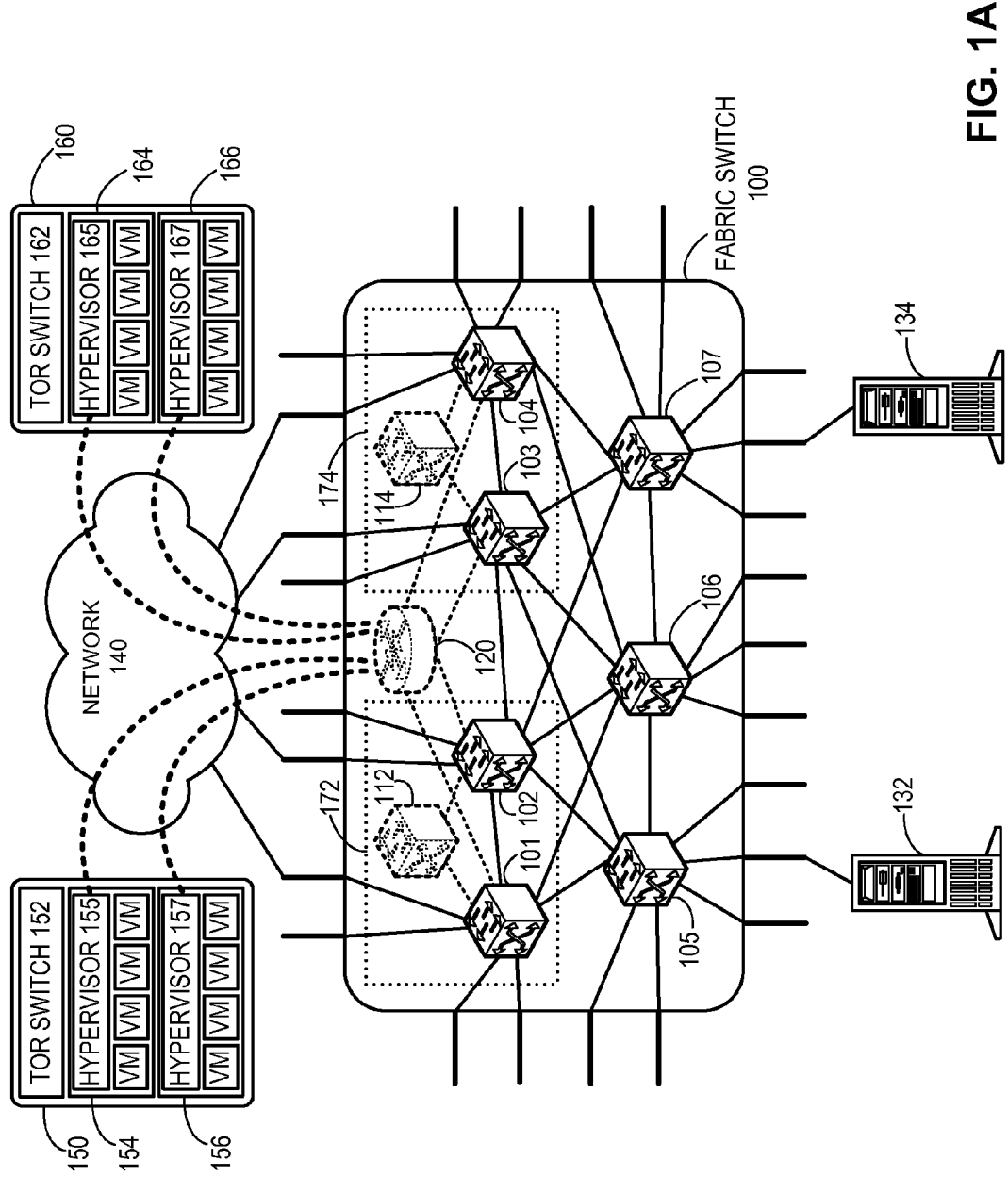
FIG. 1A illustrates an exemplary fabric switch with gateway subgroups, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of operating a fabric switch as a scalable tunnel gateway, which can be referred to as a gateway, with high availability for a large number of tunnels is solved by: (1) creating one or more gateway subgroups for a tunnel gateway instance and dedicating a group of tunnels to a respective gateway subgroup; and (2) operating the gateway switches (or gateways) in a gateway subgroup to actively forward traffic and to provide high availability among the gateways.

A hypervisor runs one or more virtual machines in a physical machine and is responsible for forwarding traffic from the virtual machines. To achieve high utilization of network devices (e.g., servers and switches), a hypervisor often requires communication to physical and virtual devices which are external to its virtual local area network (VLAN). A gateway allows the hypervisor to communicate beyond its VLAN by establishing a tunnel with the gateway. Whenever a hypervisor requires communication beyond its VLAN boundaries (e.g., across a layer-3 network), the hypervisor initiates and establishes a tunnel with the tunnel gateway.

Because a large number of hypervisors can be associated with a single network, the tunnel gateway of the network can become a bottleneck. To reduce the bottleneck, a fabric switch can operate as a virtual gateway. One or more member switches of the fabric switch physically operate as gateways and appear as the same virtual gateway to an external network. As a result, a routing device (e.g., an Internet Protocol (IP) router) in the external network can direct the tunnels toward any of the gateways. This can lead to load imbalance of tunnel termination among the gateways. For example, one gateway can participate in a large number of tunnel terminations and another gateway can remain underutilized. Furthermore, a gateway may have an upper limit of the number of tunnels supported due to a hardware limitation. Such an imbalance can direct more tunnels toward a gateway than that upper limit.

To solve this problem, the gateways of a fabric switch are grouped into gateway subgroups. These subgroups represent the virtual gateway. A respective gateway subgroup is associated with one or more source sub networks (subnets) (e.g., IP subnets) of tunnels. Since the gateways of a fabric switch present the entire fabric switch as a logical tunnel gateway to any external network, a hypervisor establishes a tunnel with that virtual gateway via the external network. For example, the hypervisor can encapsulate a packet in the tunnel encapsulation (e.g., an IP encapsulation) and forwards that encapsulated packet to the virtual gateway. It should be noted that an encapsulation typically includes an additional encapsulation header. In some embodiments, the virtual gateway can be associated with a virtual IP address and a virtual Media Access Control (MAC) address. That virtual IP address is then included as the destination address of the tunnel encapsulation (i.e., the added header of the tunnel encapsulation). One of the gateways of the fabric receives that packet.

The gateway then checks whether the local gateway group is associated with the source subnet (i.e., the subnet of the source address of the tunnel header) of the tunnel encapsulation. If so, the gateway terminates the tunnel by decapsulating the packet from its tunnel encapsulation. Otherwise, the gateway identifies a gateway subgroup associated with the source subnet and performs a packet handoff to the identified gateway subgroup. The handoff process comprises the gateway encapsulating the tunnel-encapsulated packet in a fabric encapsulation (e.g., a TRILL encapsulation) and forwarding that fabric-encapsulated packet to the identified gateway subgroup. Furthermore, a respective gateway in a gateway subgroup actively terminates traffic. On top of that, the gateways in the gateway subgroup provide high availability among each other. For example, if one gateway fails, another gateway can start receiving the tunnel-encapsulated packets destined to the failed gateway. This allows "active-active" high availability among the gateways of the gateway subgroup.

In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In this disclosure, the term "fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "hypervisor" is used in a generic sense, and can refer to any virtual machine manager. Any software, firmware, or hardware that creates and runs virtual machines can be a "hypervisor." The term "virtual machine" is also used in a generic sense and can refer to software implementation of a machine or device. Any virtual device which can execute a software program similar to a physical device can be a "virtual machine." A host external device on which a hypervisor runs one or more virtual machines can be referred to as a "host machine."

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

In this disclosure, the term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). In a generic sense, the term "port" can refer to any port of a switch, including an "edge port." The term "inter-switch port" refers to a port which sends/receives data frames among member switches of a fabric switch. The terms "interface" and "port" are used interchangeably.

The term "switch identifier" refers to a group of bits that can be used to identify a switch. Examples of a switch identifier include, but are not limited to, a MAC address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

The term "loop" is used in a generic sense, and it can refer to any number of standalone and fabric switches coupled to each other in such a way that at least one of the switches may receive a frame previously originated from the same switch. A network loop can be formed based on the external connectivity of a switch. For a fabric switch, a loop can be formed by the edge ports.

The term "fabric switch" refers to a number of interconnected physical switches which form a single, scalable logical switch. In a fabric switch, any number of switches can be connected in an arbitrary topology and the entire group of switches functions together as one single switch. This feature makes it possible to use many smaller, inexpensive switches to construct a large fabric switch, which can be viewed externally as a single switch.

Network Architecture

FIG. 1A illustrates an exemplary fabric switch with gateway subgroups, in accordance with an embodiment of the present invention. As illustrated in FIG. 1A, a fabric switch 100 includes member switches 101, 102, 103, 104, 105, 106, and 107. Switches 105 and 107 are coupled to end devices 132 and 134, respectively. In some embodiments, fabric switch 100 is a TRILL network and a respective member switch of fabric switch 100, such as switch 105, is a TRILL RBridge. Switches in fabric switch 100 use edge ports to communicate with end devices (e.g., non-member switches) and inter-switch ports to communicate with other member switches. For example, switch 105 is coupled to end device 132 via an edge port and to switches 101, 102, 103, and 106 via inter-switch ports and one or more links. Data communication via an edge port can be based on Ethernet and via an inter-switch port can be based on TRILL protocol. It should be noted that control message exchange via inter-switch ports can be based on a different protocol (e.g., Internet Protocol (IP) or Fibre Channel (FC) protocol).

Server rack 150 includes computing devices 154 and 156, which communicate via switch 152. Similarly, server rack 160 includes computing devices 164 and 166, which communicate via switch 162. In some embodiments, switch 152 and 162 are top of the rack (ToR) switches. Virtual machines hosted in computing devices 154, 156, 164, and 166 run on hypervisors 155, 157, 165, and 167, respectively. When a virtual machine generates a packet, that virtual machine provides that packet to its corresponding hypervisor for external communication. When communicating outside of the virtual machine's VLAN boundary, that hypervisor establishes a tunnel based on a tunneling protocol with a gateway and forwards that packet using tunnel encapsulation to the gateway. Examples of such a tunneling protocol include, but are not limited to, Virtual Extensible Local Area Network (VX-LAN), Generic Routing Encapsulation (GRE), and its variations, such as Network Virtualization using GRE (NVGRE) and Open vSwitch GRE.

In this example, fabric switch 100 operates as a gateway for a large number of hypervisors, including hypervisors 155, 157, 165, and 167. Fabric switch 100 is virtualized as a virtual gateway 120 to external network 140. In some embodiments, virtual gateway 120 can be associated with a virtual IP address and a virtual MAC address. To reach virtual gateway 120, tunnel-encapsulated packets are sent to that virtual IP address. This virtual gateway 120 is physically represented by gateway switches 101, 102, 103, and 104 (denoted with dotted lines). In other words, switches 101, 102, 103, and 104 in fabric switch 100 also operate as tunnel gateways (and are interchangeably referred to as gateways 101, 102, 103, and 104, respectively). These gateways physically represent virtual gateway 120. A hypervisor, such as hypervisor 155, views these gateways as virtual gateway 120.

Typically, a server rack, such as server rack 150 or 160, can host a large number of computing devices running their respective hypervisors. As a result, a large number of hypervisors can be associated with network 140 and establish tunnels with virtual gateway 120 (i.e., send tunnel-encapsulated packets toward virtual gateway 120). However, since virtual gateway 120 is represented by gateways 101, 102, 103, and 104, a tunnel-encapsulated packet from a hypervisor, such as hypervisor 155, can be routed via network 140 and reach any of these gateways in fabric switch 100. This can lead to a load imbalance of tunnel termination among gateways 101, 102, 103, and 104. For example, gateway 101 can participate in a large number of tunnel terminations and gateway 103 can remain underutilized. Furthermore, a gateway, such as gateway 101, may have an upper limit of the number of tunnels supported due to a hardware limitation. Consequently, the imbalance can direct more tunnels toward gateway 101 than can be supported by gateway 101.

To solve this problem, gateways 101 and 102 are grouped into gateway subgroup 172 and gateways 103 and 104 are grouped into gateway subgroup 174. Instead of individual gateways, gateway subgroups 172 and 174 represent virtual gateway 120. A respective gateway subgroup is associated with one or more source subnets (e.g., IP subnets) of tunnels. A gateway subgroup terminates a tunnel if the source subnet of the tunnel is associated with that gateway subgroup. Suppose that the subnet(s) of hypervisors 155 and 157 is associated with gateway subgroup 172 and the subnet(s) of hypervisors 165 and 167 is associated with gateway subgroup 174. As a result, a tunnel from hypervisor 155 is terminated at either gateway 101 or 102 of gateway subgroup 172. Similarly, a tunnel from hypervisor 165 is terminated at either gateway 103 or 104 of gateway subgroup 174.

In some embodiments, a respective gateway subgroup includes a virtual switch and a respective gateway in a gateway subgroup is logically coupled to that virtual switch. For example, gateway subgroup 172 includes virtual switch 112 and gateways 101 and 102 are logically coupled to virtual switch 112 (denoted with dotted lines). Similarly, gateway subgroup 174 includes virtual switch 114 and gateways 103 and 104 are logically coupled to virtual switch 114. In some embodiments, virtual switch 112 is associated with a virtual switch identifier. This virtual switch identifier is associated with gateways 101 and 102. As a result, gateways 101 and 102 consider that virtual switch identifier to be local. Consequently, gateway 101 or 102 considers a packet with the virtual switch identifier as the destination address to be destined to itself. This allows both gateways 101 and 102 to receive packets with the same destination address (e.g., the virtual switch identifier). Similarly, virtual switch 114 is associated with a virtual switch identifier, which is associated with gateways 103 and 104.

In some embodiments, a respective gateway maintains a data structure (e.g., a table) which maps a gateway subgroup to a virtual switch. A respective member switch outside of a gateway subgroup considers a virtual switch as another member switch and is coupled to the gateways of the gateway subgroup. For example, switch 103, which is a gateway, and switch 105, which is not a gateway, can consider switch 112 as another member switch reachable via gateways 101 and 102, which are also member switches. As a result, to send a packet toward a gateway subgroup, other member switches send the packet toward the corresponding virtual switch, and one of the gateways eventually receives the packet. In some embodiments, a virtual switch is associated with one or more virtual identifiers. For example, if virtual switch 112 is a virtual RBridge, virtual switch 112 is associated with a virtual RBridge identifier and/or a virtual MAC address.

During operation, hypervisor 155 obtains a packet from one of the virtual machines in computing device 154 for end device 132. Hypervisor 155 encapsulates the packet in a tunnel encapsulation (e.g., an IP encapsulation) with a virtual gateway identifier (e.g., the virtual IP and/or the virtual MAC addresses) as the destination identifier of the tunnel encapsulation (i.e., the header of the tunnel encapsulation). Hypervisor 155 includes its identifier (e.g., the IP and/or MAC addresses) as the source identifier of the tunnel encapsulation and forwards that encapsulated packet via switch 152 and network 140 to virtual gateway 120. When the packet reaches fabric switch 100, one of the gateways of fabric switch 100 receives that packet. If the gateway group of the gateway is associated with the subnet of the identifier of hypervisor 155 (i.e., the source subnet of the encapsulation), the gateway terminates the tunnel. Otherwise, the gateway hands the packet off to a gateway in a gateway group associated with the subnet of the identifier of hypervisor 155.

For example, if gateway 101 receives the packet, gateway 101 checks whether local gateway subgroup 172 is associated with the subnet of the identifier of hypervisor 155. Because the subnet of the identifier of hypervisor 155 is associated with gateway subgroup 172, gateway 101 terminates the tunnel by decapsulating the packet from its tunnel encapsulation. On the other hand, if gateway 103 receives the packet, local gateway group 174 is not associated with the subnet of the identifier of hypervisor 155. As a result, gateway 103 identifies the gateway subgroup, which is gateway subgroup 172, associated with the subnet of the identifier of hypervisor 155. Gateway 103 then performs a packet handoff to identified gateway subgroup 172 and sends the packet to one of the gateways (e.g., gateway 101) in gateway subgroup 172. In this way, the tunnels terminating at fabric switch 100 are distributed across gateway subgroups 172 and 174, and overloading of a gateway can be avoided.

Upon decapsulating the packet (i.e., removing the tunnel encapsulation, which includes the header of the tunnel encapsulation), gateway 101 obtains the inner packet. Gateway 101 then encapsulates the inner packet in a fabric encapsulation and includes the virtual identifier(s) of virtual switch 112 as the ingress switch identifier of the fabric encapsulation (i.e., the header of the fabric encapsulation). For example, if the fabric encapsulation is based in the TRILL protocol, switch 101 includes the virtual RBridge identifier of virtual switch 112 as the ingress RBridge identifier of the TRILL encapsulation (i.e., the TRILL header). If switch 101 has already learned the MAC address of end device 132, switch 101 has also learned that end device 132 is coupled to switch 105. Otherwise, switch 101 uses an address discovery technique (e.g., a broadcast message in fabric switch 100) to obtain the MAC address of end device 132. Switch 101 then includes the switch identifier (e.g., an RBridge identifier) of switch 105 as the egress switch identifier of the fabric encapsulation.

Gateway 101 then forwards that fabric-encapsulated packet to switch 105. Upon receiving the packet, switch 105 identifies itself as the egress switch, decapsulates the fabric encapsulation, and obtains the inner packet. At the same time, switch 105 identifies that the source of the fabric encapsulation is switch 112; hence the source of the inner packet is reachable via switch 112. If end device 132 sends back a packet toward the virtual machine in computing device 154, ingress switch 105 receives that packet and identifies that the destination is reachable via switch 112.

Switch 105 then encapsulates the packet in the fabric encapsulation and includes the virtual identifier(s) of virtual switch 112 as the egress switch address and the switch identifier of switch 105 as the ingress switch identifier of the fabric encapsulation. Switch 105 forwards the fabric-encapsulated packet to switch 112. That encapsulated packet is received by either gateway 101 or 102. Gateway 101 or 102, in turn, decapsulates the fabric encapsulation, identifies the destination of the inner packet, encapsulates the inner packet in a corresponding tunnel encapsulation, and forwards the tunnel-encapsulated packet to the virtual machine via network 140.

Furthermore, if a gateway in a gateway group fails, the other gateway can still terminate tunnels with the tunnel source subnet associated with the group. This allows gateways in the gateway group to actively forward traffic and provide high availability to each other. It should be noted that this "active-active" mode of high availability is different than the "active-standby" mode of high availability, wherein only one device actively operates and one or more other devices remain on standby. A standby device becomes active if the active device fails. For example, gateway subgroup 172 operates in "active-active" mode, wherein gateways 101 and 102 both actively terminate tunnels and provide high availability to each other.

Figure 1B:
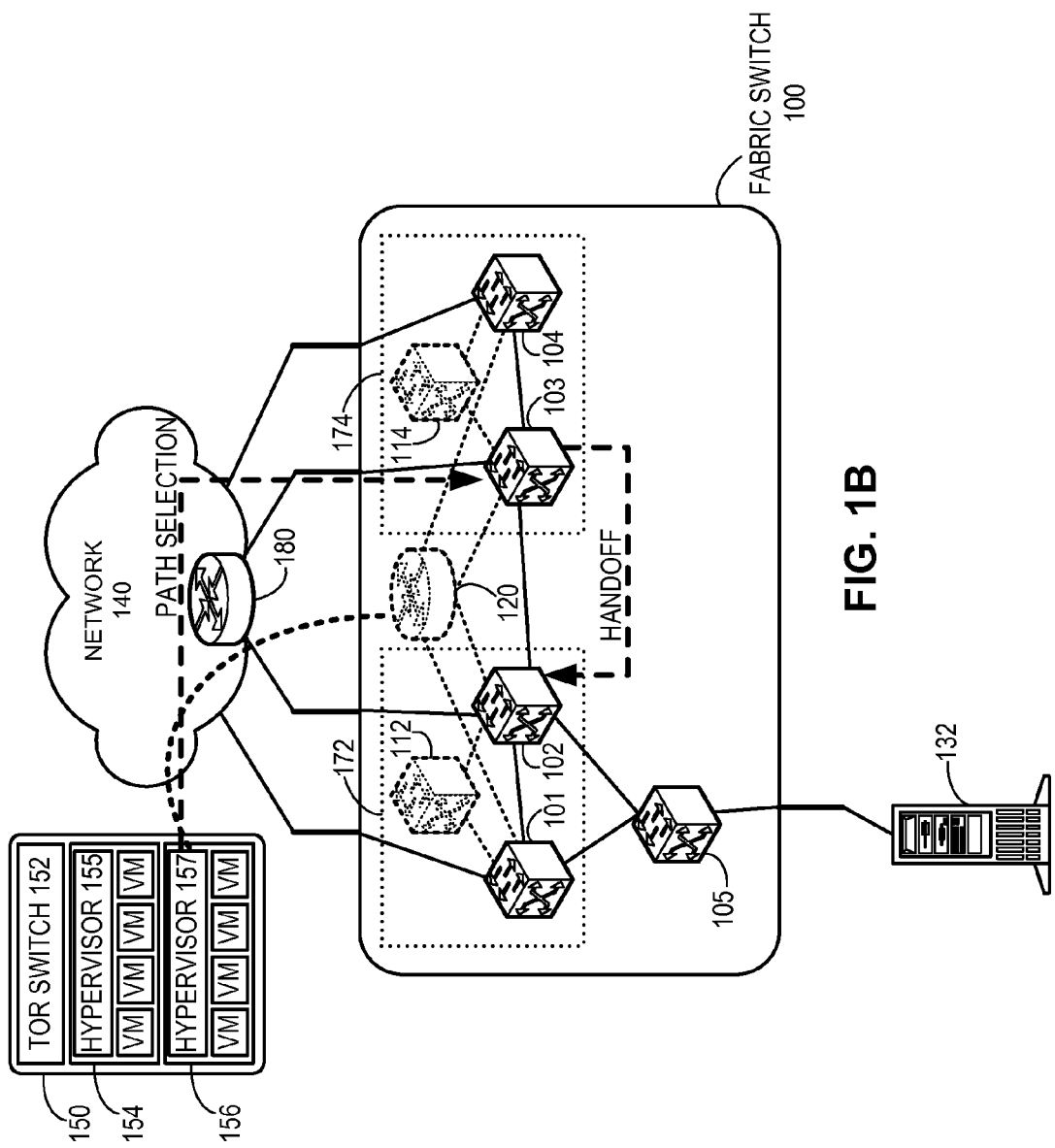
FIG. 1B illustrates an exemplary handoff of a packet between gateway subgroups in a fabric switch, in accordance with an embodiment of the present invention.

FIG. 1B illustrates an exemplary handoff of a packet between gateway subgroups in a fabric switch, in accordance with an embodiment of the present invention. The handoff process is triggered when a gateway in a gateway subgroup receives a tunnel-encapsulated packet that does not have a tunnel source subnet associated with the gateway subgroup. In some embodiments, a respective gateway in a fabric switch maintains a data structure (e.g., a table) indicating (or mapping) which gateway subgroup is associated with which source subnets. The handoff process comprises the gateway encapsulating the tunnel-encapsulated packet in a fabric encapsulation (e.g., a TRILL encapsulation) and forwarding that fabric-encapsulated (and tunnel-encapsulated) packet to the identified subgroup.

During operation, hypervisor 157 obtains a packet from one of the virtual machines in computing device 156 for end device 132. Hypervisor 157 encapsulates the packet in a tunnel encapsulation with the virtual IP address of virtual gateway 120 as the destination identifier of the tunnel encapsulation (i.e., the header of the tunnel encapsulation). Hypervisor 157 includes its IP address as the source identifier of the tunnel encapsulation and forwards that encapsulated packet via switch 152 and network 140 to virtual gateway 120. Suppose that the edge router of network 140, which is coupled to fabric switch 100 via one or more links, is router 180. In some embodiments, router 180 considers that virtual gateway 120 is reachable via gateways 101, 102, 103, and 104. In other words, router 180 can have multiple paths to virtual gateway 120. These paths can be equal cost multiple paths (ECMP) in layer-2 and/or layer-3.

Router 180 selects one of the paths and forwards the packet to virtual gateway 120. This path selection from multiple paths, which can also be referred to as "spraying," can be based on one or more spraying policies. Examples of such policies include, but are not limited to, load balancing, security, configured preferences, order of addresses, and address hashing. In some embodiments, router 180 uses a virtual MAC address of virtual gateway 120 as the destination address when router 180 forwards the packet to virtual gateway 120 via layer-2. When the packet reaches fabric switch 100, one of the gateways of fabric switch 100 receives that packet.

Suppose that gateway 103 receives the packet and checks whether local gateway subgroup 174 is associated with the subnet of the identifier of hypervisor 157. Because the subnet of the identifier of hypervisor 157 is not associated with gateway subgroup 174, gateway 103 initiates the handoff process. First, gateway 103 identifies the gateway subgroup, which is gateway subgroup 172, associated with the subnet of the identifier of hypervisor 157. Gateway 103 then encapsulates the tunnel-encapsulated packet in a fabric encapsulation (e.g., TRILL encapsulation) and sends the fabric- and tunnel-encapsulated packet to one of the gateways in gateway subgroup 172. In some embodiments, during the handoff process, gateway 103 sends the packet toward virtual switch 112. Because gateway 103 considers virtual switch 112 to be reachable via either gateway 101 or 102, gateway 103 selects one of these paths and sends the packet via the selected path. Gateway 103 can select the path based on one or more spraying policies.

Figure 1C:
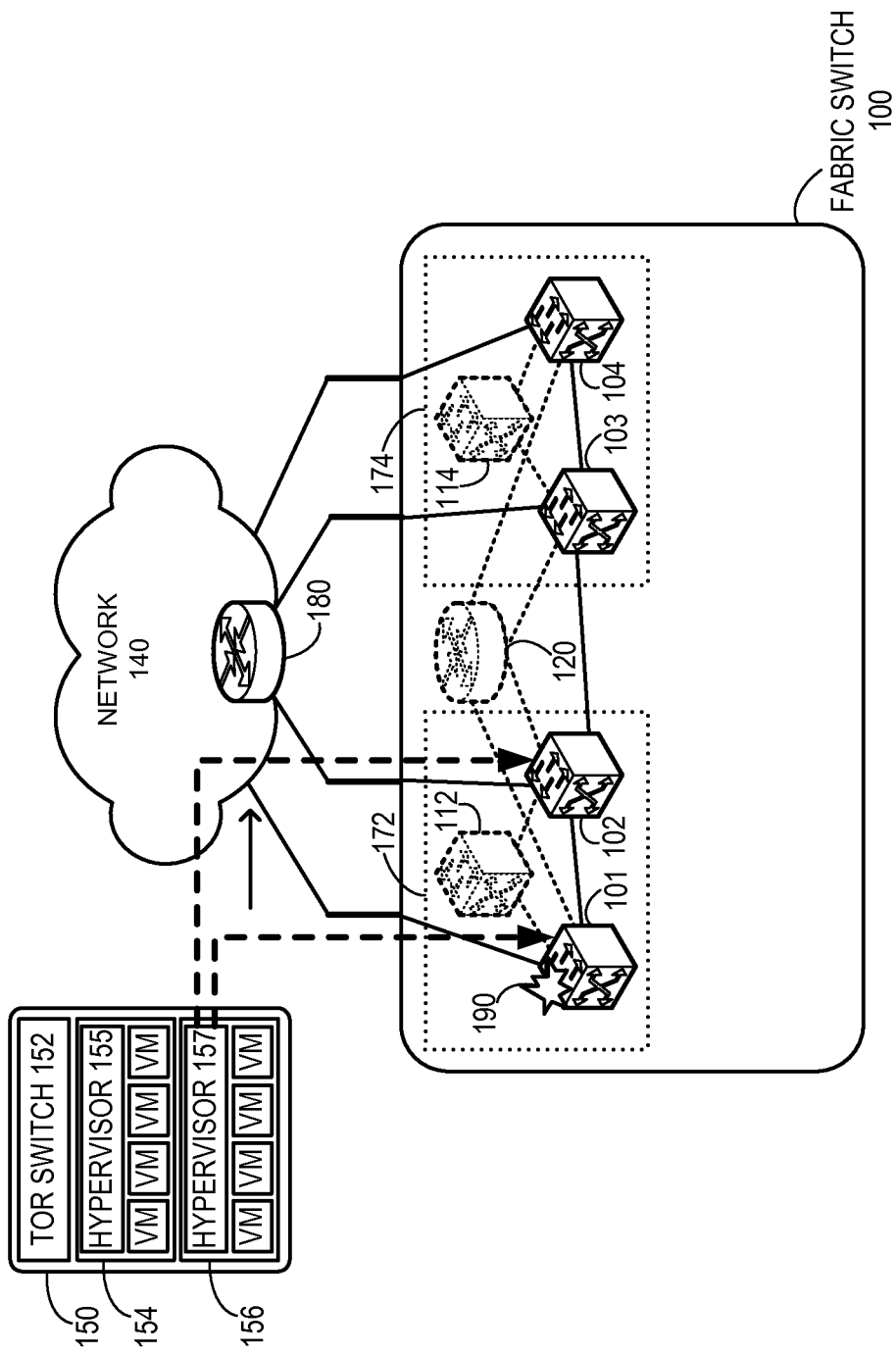
FIG. 1C illustrates exemplary high availability in a gateway subgroup in a fabric switch, in accordance with an embodiment of the present invention.

FIG. 1C illustrates exemplary high availability in a gateway subgroup in a fabric switch, in accordance with an embodiment of the present invention. High availability ensures that if a device or part of a device becomes unavailable due to an event, the operations designated for the device can be readily carried out by another device. Examples of such events include, but are not limited to, hardware and/or software failure, power failure, switching on and/or off, and device reboot. In the example in FIG. 1C, source subnet(s) of hypervisors 155 and 157 are associated with gateway subgroup 172. As a result, both gateways 101 and 102 can actively terminate tunnels from hypervisors 155 and 157. In other words, tunnel-encapsulated packets from hypervisors 155 and 157 are decapsulated at either gateway 101 or 102.

Suppose that gateway 101 becomes unavailable due to event 190. However, gateway 102 still remains in gateway subgroup 172 and hence, is still associated with the source subnets of hypervisors 155 and 157. As a result, gateway 102 continues to terminate tunnels from hypervisors 155 and 157, thereby providing an "active-active" high availability to gateway subgroup 172. It should be noted that when event 190 occurs, gateway 102 (or gateway 101) should be capable of processing all the tunnels for gateway subgroup 172 on its own. As a result, the number of tunnels for a gateway subgroup should conform to any upper limit of the number of tunnels for a gateway. In some embodiments, the source subnets are associated with gateway subgroup 172 in such a way that the number of tunnels terminated by gateway subgroup 172 can be individually handled by either gateway 101 or 102. For example, if gateway 101 or 102 can process up to X tunnels, gateway subgroup 172 is associated with source subnets with X possible tunnels.

Operations of Gateway Subgroup

In the example in FIG. 1A, gateway 101 or 102 of gateway subgroup 172 can receive a tunnel-encapsulated packet either from external network 140 via an edge port or from another member switch, which can be a gateway in another gateway subgroup, of fabric switch 100. For example, a gateway in gateway subgroup 172 receives the packet from a gateway in gateway subgroup 174 when the source subnet of the packet (i.e., the subnet of the source address of the tunnel header) received at gateway subgroup 174 is associated with gateway subgroup 172.

Figure 2A:
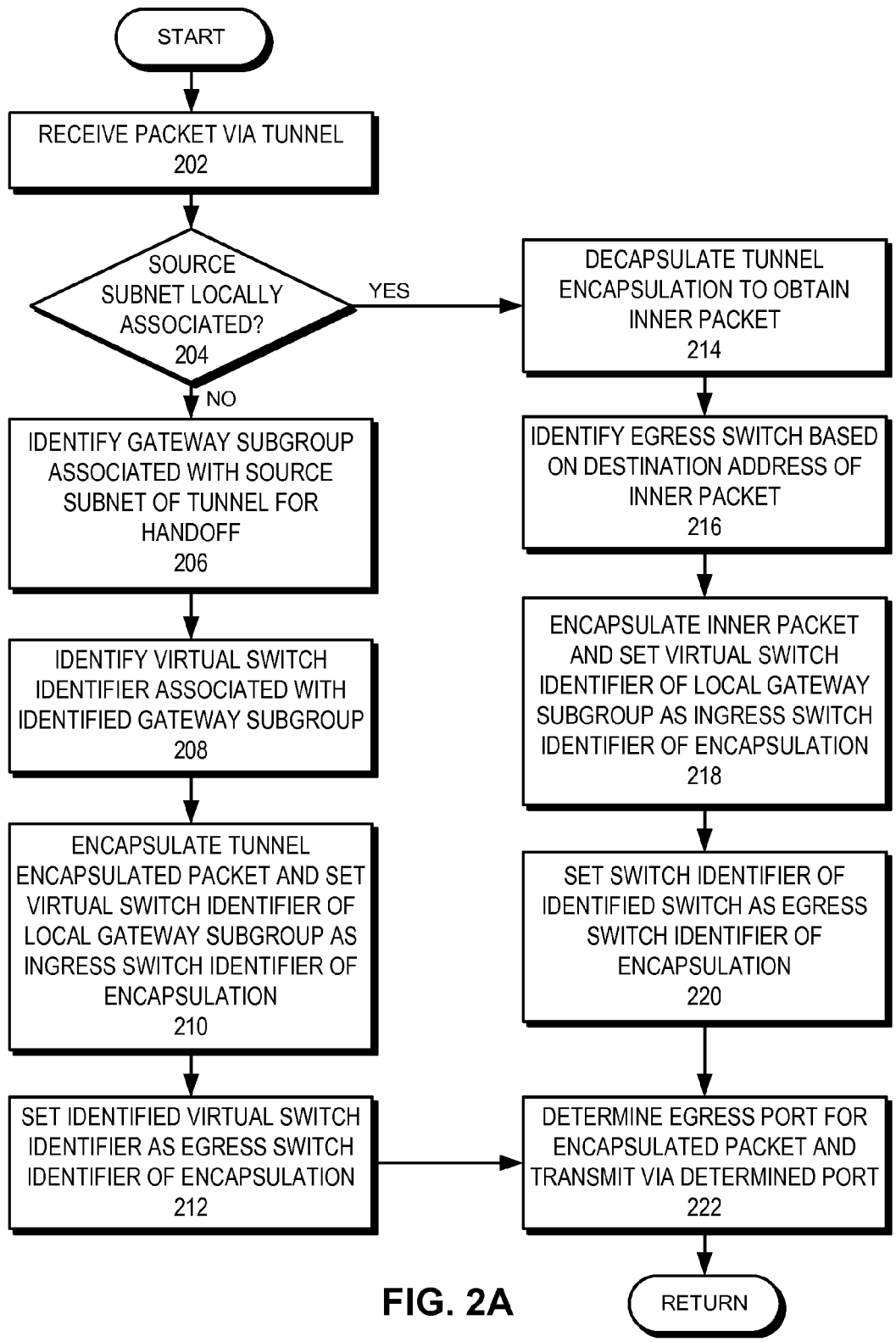
FIG. 2A presents a flowchart illustrating the process of a gateway in a gateway subgroup forwarding a packet received via a tunnel, in accordance with an embodiment of the present invention.

FIG. 2A presents a flowchart illustrating the process of a gateway in a gateway subgroup forwarding a packet received via a tunnel, in accordance with an embodiment of the present invention. During operation, the gateway receives a packet via a tunnel (e.g., via an edge port) (operation 202) and checks whether the source subnet of the tunnel is locally associated (i.e., associated with the local gateway subgroup to which the gateway belongs) (operation 204). If the source subnet is not locally associated, the gateway identifies a gateway subgroup associated with the source subnet of the tunnel for a handoff (operation 206). In some embodiments, the gateway maintains a data structure which indicates (or maps) which source subnet is associated with which gateway subgroup and identifies the gateway subgroup from the data structure.

The gateway then identifies a virtual switch identifier associated with the identified gateway subgroup (operation 208). Since a respective gateway of the identified gateway subgroup is associated with the virtual switch, operation 208 allows the gateway to spray handoff packets among the gateways of the identified gateway subgroup. This spraying can be based on one or more spraying policies. Examples of such policies include, but are not limited to, load balancing, security, configured preferences, order of addresses, and address hashing. In some embodiments, the gateway maintains a data structure (which can be the same or a different one) which maps a virtual switch identifier with a gateway subgroup and the gateway identifies the virtual switch identifier from the data structure.

The gateway then further encapsulates the tunnel-encapsulated packet and sets the virtual switch identifier of the local gateway subgroup as the ingress switch identifier of the encapsulation (operation 210). This encapsulation can be a fabric encapsulation (e.g., a TRILL encapsulation). The gateway sets the identified virtual switch identifier as the egress switch identifier of the encapsulation (operation 212). In the example in FIG. 1B, gateway 103 encapsulates a tunnel-encapsulated packet in a fabric encapsulation. Gateway 103 sets the virtual switch identifier of virtual switch 114, which is associated with local gateway subgroup 174, as the ingress switch identifier of the encapsulation and the virtual switch identifier of virtual switch 112, which is associated with gateway subgroup 172, as the egress switch identifier of the encapsulation.

If the source subnet is locally associated (operation 204), the gateway decapsulates the tunnel encapsulation to obtain the inner packet (operation 214) and identifies the egress switch for the packet based on the destination address of the inner packet (operation 216). In the example in FIG. 1A, upon decapsulating the tunnel encapsulation of a packet, gateway 101 determines switch 105 as the egress switch based on the destination address of the inner packet, which corresponds to end device 132. The gateway then encapsulates the inner packet and sets the virtual switch identifier of the local gateway subgroup as the ingress switch identifier of the encapsulation (operation 218). This encapsulation can be a fabric encapsulation (e.g., a TRILL encapsulation). The gateway sets the switch identifier of the identified switch as the egress switch identifier of the encapsulation (operation 220). After setting the egress switch identifier of the encapsulation (operation 212 or 220), the gateway determines the egress port, which can be an inter-switch port, for the encapsulated packet and transmits the packet via the determined port (operation 222).

Figure 2B:
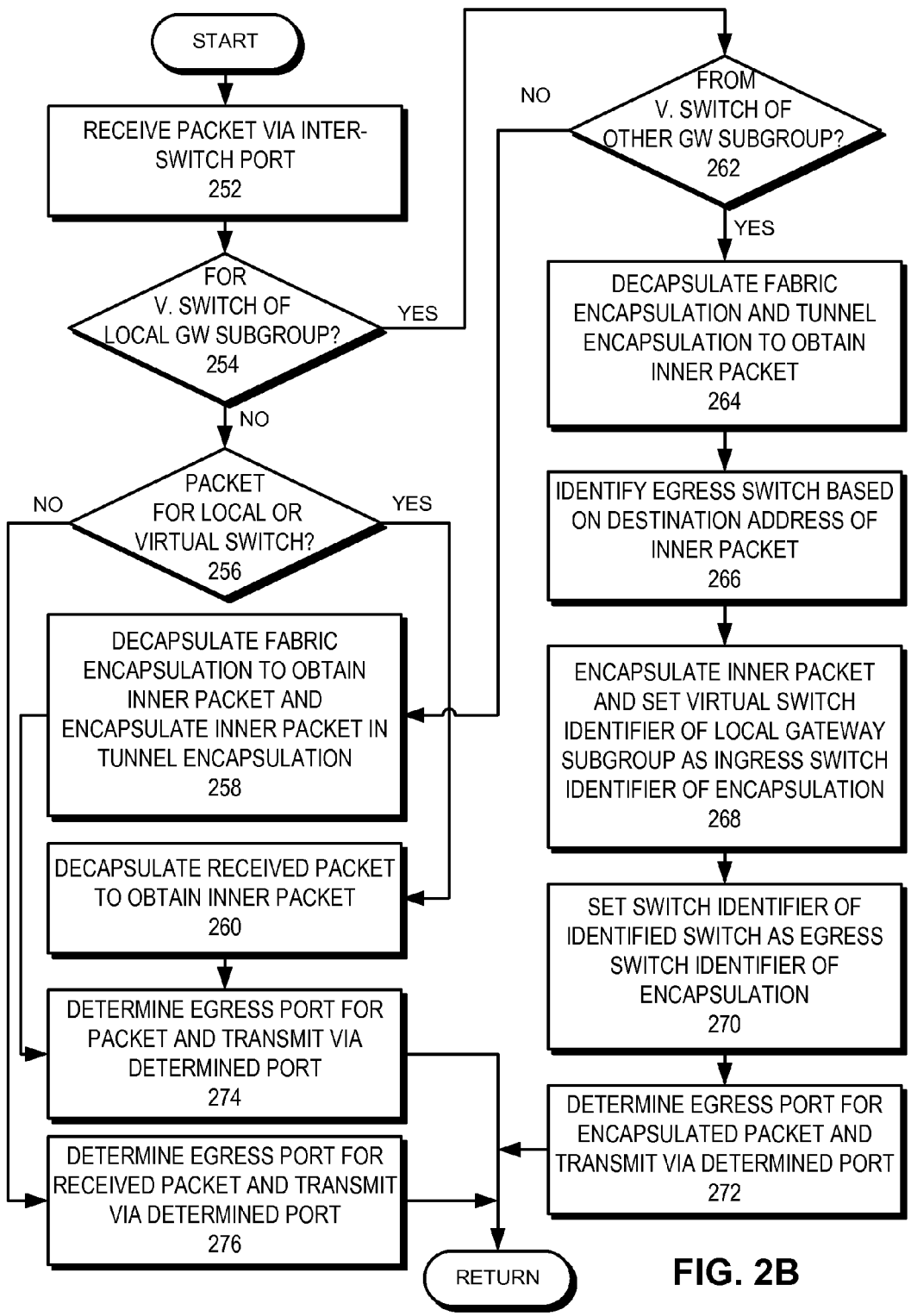
FIG. 2B presents a flowchart illustrating the process of a gateway in a gateway subgroup forwarding a packet received via an inter-switch port, in accordance with an embodiment of the present invention.

FIG. 2B presents a flowchart illustrating the process of a gateway switch of a gateway subgroup forwarding a packet received via an inter-switch port, in accordance with an embodiment of the present invention. During operation, the gateway receives a packet via an inter-switch port (operation 252). In some embodiments, this packet is received from another switch in a fabric switch and the packet is a fabric-encapsulated packet. The gateway checks whether the packet is for the virtual switch of the local gateway subgroup (e.g., the egress switch identifier of the packet corresponds to the virtual switch identifier of the local gateway subgroup) (operation 254). If the packet is for the virtual switch of the local gateway subgroup, the gateway checks whether the packet is from the virtual switch of another gateway subgroup (e.g., the ingress switch identifier of the packet corresponds to the virtual switch identifier of another gateway subgroup) (operation 262).

If the packet is for the virtual switch of the local gateway subgroup and from the virtual switch of another gateway subgroup, the packet is a handoff packet. In some embodiments, a handoff packet is a fabric- and tunnel-encapsulated packet. The gateway then decapsulates the fabric- and tunnel encapsulations to obtain the inner packet (operation 264) and identifies the egress switch for the packet based on the destination address of the inner packet (operation 266). In the example in FIG. 1B, gateway 102 decapsulates the fabric encapsulation of gateway 103 and tunnel encapsulation of hypervisor 157 to obtain the inner packet. The gateway encapsulates the inner packet, which can be fabric encapsulation, and sets the virtual switch identifier of the local gateway subgroup as the ingress switch identifier of the encapsulation (operation 268). The gateway sets the switch identifier of the identified switch as the egress switch identifier of the encapsulation (operation 270), and determines the egress port, which can be an inter-switch port, for the encapsulated packet and transmits the packet via the determined port (operation 272).

If the packet is for the virtual switch of the local gateway subgroup and not from the virtual switch of another gateway subgroup, the packet is addressed based on MAC address learning of a remote switch. In the example in FIG. 1A, switch 105 learns the MAC address of hypervisor 155 to be reachable via virtual switch 112. As a result, to send a packet to hypervisor 155, switch 105 uses the virtual identifier of virtual switch 112 as the destination address of the fabric encapsulation. If the packet is for the virtual switch of the local gateway subgroup and not from the virtual switch of another gateway subgroup, the gateway decapsulates the fabric encapsulation to obtain the inner packet and encapsulates the packet in a tunnel encapsulation (operation 258). If the packet is not for the virtual switch of the local gateway subgroup, the gateway checks whether the packet is for the local or a virtual switch (operation 256). Such a packet can be for a virtual switch associated with a virtual link aggregation (VLAG), which includes the gateway. A virtual link aggregation allows a plurality of links of a plurality of switches to operate as a single logical link.

If the packet is for a local or a virtual switch, the gateway decapsulates the received packet to obtain the inner packet (operation 260). After the tunnel encapsulation (operation 258) or after obtaining the inner packet (operation 260), the gateway determines an egress port, which can be an edge port, for the packet and transmits the packet via the determined port (operation 274). It should be noted that the egress port is determined based on, for the tunnel-encapsulated packet, the egress switch identifier of the tunnel encapsulation and, for the inner packet, the egress switch identifier of the inner packet. If the packet is not for a local or a virtual switch, the packet is for another switch and the gateway is an intermediate switch. The gateway then determines the egress port, which can be an inter-switch port, for the received packet and transmits the packet via the determined port (operation 276). In some embodiments, the egress port is determined based on the egress switch identifier of the fabric encapsulation of the received packet.

Multi-Destination Suppression in Gateway Subgroup

In some embodiments, when a gateway of a gateway subgroup in a fabric switch receives a multi-destination packet belonging to broadcast, unknown unicast, or multicast (BUM) traffic, the gateway forwards the packet to appropriate destinations via the local edge ports. Examples of appropriate destinations include, but are not limited to, members of a multicast tree, end devices coupled to edge ports other than the ingress port, and tunnel destinations other than the ingress tunnel. Furthermore, the gateway broadcasts that packet to other member switches of the fabric switch. Other gateways of the gateway subgroup, in turn, also receive the packet and forward the packet to appropriate destinations. As a result, the packet can go back to the device from which the gateway has received the packet. This can lead to packet looping.

Figure 3:
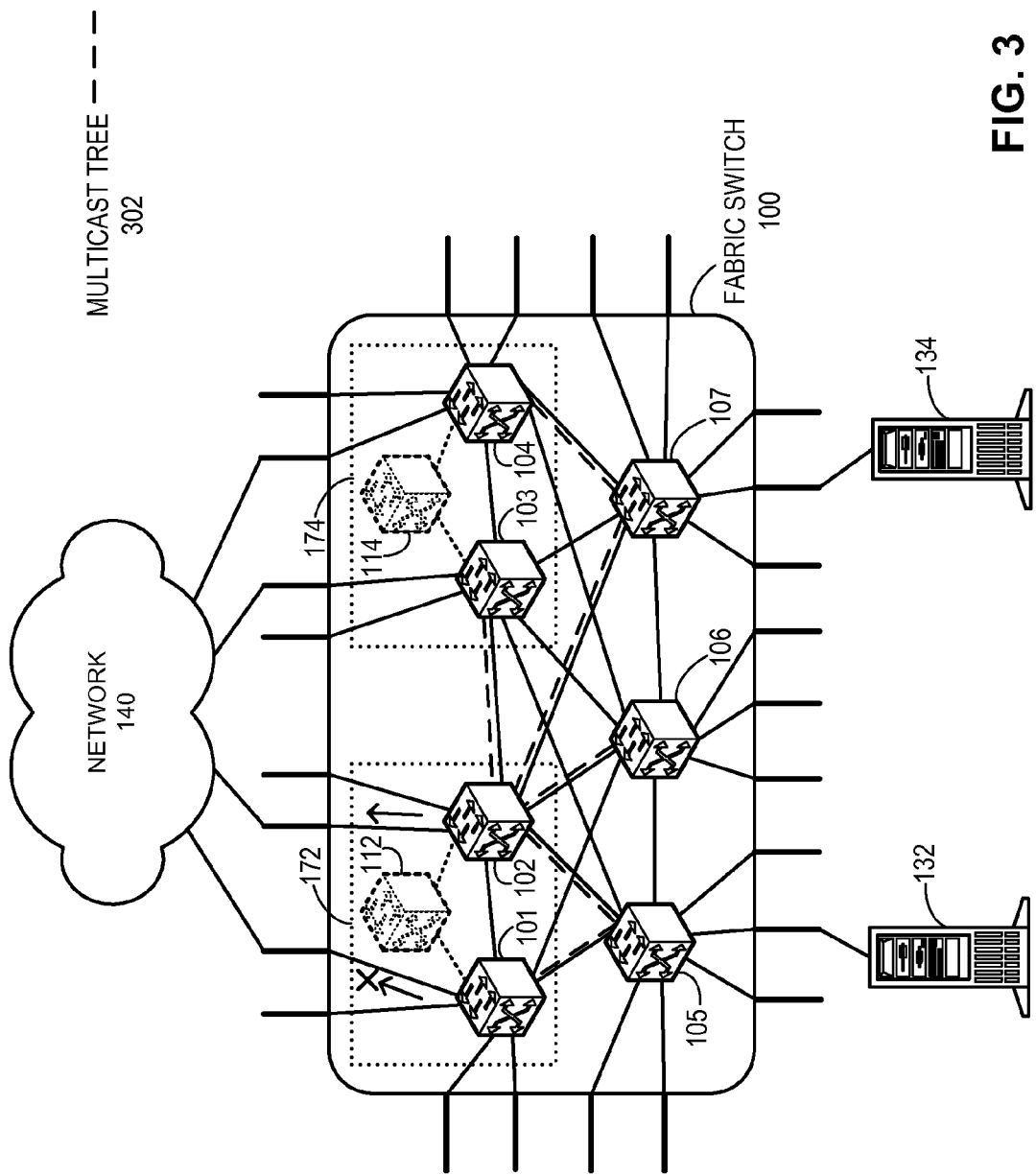
FIG. 3 illustrates an exemplary multi-destination suppression in a gateway subgroup in a fabric switch, in accordance with an embodiment of the present invention.

To solve this problem, only one of the gateways in a gateway subgroup operates as a designated forwarder and forwards multi-destination packets via its edge ports. Other gateways in the gateway subgroup suppress forwarding of multi-destination packets via the edge ports. FIG. 3 illustrates an exemplary multi-destination suppression in a gateway subgroup in a fabric switch, in accordance with an embodiment of the present invention. Suppose that gateway 102 is the designated forwarder for gateway subgroup 172. Only gateway 102 in gateway subgroup 172 forwards multi-destination packets via its edge ports.

During operation, gateway 102 of gateway subgroup 172 receives a multi-destination packet. Gateway 102 forwards the packet to appropriate destinations via the local edge ports (denoted with an arrow). For example, gateway 102 can forward the packet via one or more tunnels to hypervisors 155 and 157. Gateway 102 also broadcasts that packet to other member switches of fabric switch 100. In some embodiments, gateway 102 forwards the packet via multicast tree 302 of fabric switch 100 to distribute the packet. The other gateway of gateway subgroup 172, which is gateway 101, also receives the packet. However, since gateway 101 is not the designated forwarder, gateway 101 suppresses forwarding of multi-destination packets via the edge ports (denoted by an "X"). In this way, packet looping of multi-destination packets is prevented in a gateway subgroup.

Figure 4A:
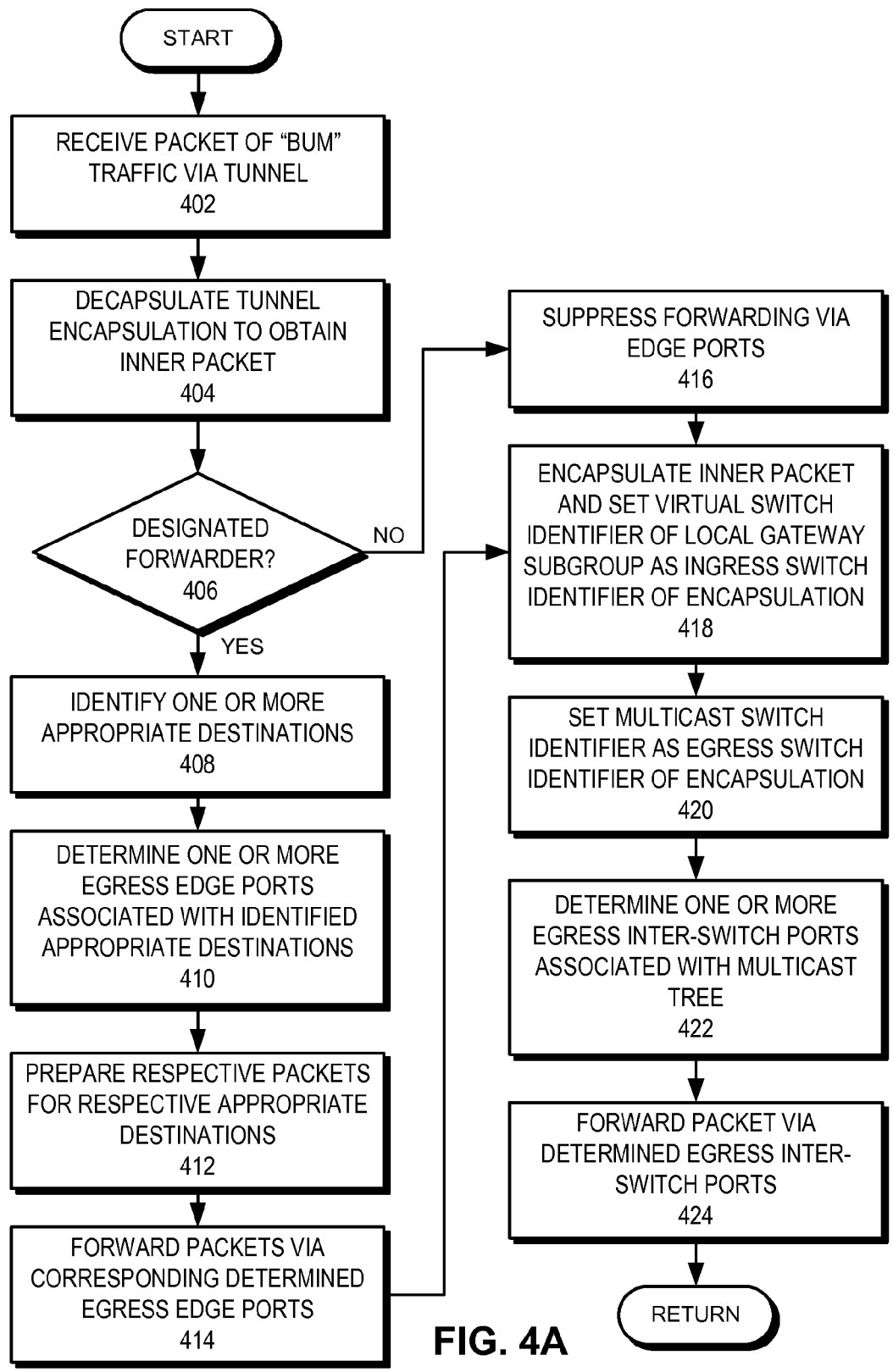
FIG. 4A presents a flowchart illustrating the process of a gateway in a gateway subgroup forwarding a packet of broadcast, unknown unicast, or multicast (BUM) traffic received via a tunnel, in accordance with an embodiment of the present invention.

FIG. 4A presents a flowchart illustrating the process of a gateway in a gateway subgroup forwarding a packet of broadcast, unknown unicast, or multicast (BUM) traffic received via a tunnel, in accordance with an embodiment of the present invention. During operation, the gateway receives a packet of BUM traffic via a tunnel (operation 402) and decapsulates the tunnel encapsulation to obtain the inner packet (operation 404). The gateway then checks whether the local gateway is the designated forwarder for multi-destination packets (operation 406). If the local gateway is the designated forwarder, the gateway identifies one or more appropriate destinations (operations 408) and determines one or more edge ports associated with the identified appropriate destinations (operation 410). Examples of appropriate destinations include, but are not limited to, members of a multicast tree, end devices coupled to edge ports other than the ingress port, and tunnel destinations other than the ingress tunnel.

The gateway then prepares respective packets for respective appropriate destinations (operation 412). For example, if the appropriate destination is reachable via a tunnel, the gateway encapsulates the packet in a tunnel encapsulation. If the appropriate destination is locally coupled via an edge port, the gateway simply uses the inner packet. The gateway forwards the packets via corresponding determined egress edge ports (operation 414). In this way, the gateway can forward multi-destination packets not only to the locally coupled destinations but also to remote destinations reachable via a tunnel. In the example in FIG. 1A, if gateway 102 is the designated forwarder for gateway subgroup 172 and a virtual machine in computing device 156 is an appropriate destination, gateway 102 encapsulates a multi-destination packet in a tunnel encapsulation and forwards the tunnel-encapsulated packet toward hypervisor 157.

If the gateway is not a designated forwarder (operation 406), the gateway suppresses forwarding via edge ports (operation 416). If the gateway has forwarded packets or suppressed forwarding via edge ports (operation 414 or 416), the gateway encapsulates the inner packet and sets the virtual switch identifier of the local gateway subgroup as the ingress switch identifier of the encapsulation (operation 418). This encapsulation can be a fabric encapsulation (e.g., a TRILL encapsulation). It should be noted that if the gateway is a designated forwarder, the gateway can perform operations 408 and 418 in parallel. The gateway sets a multicast switch identifier as the egress switch identifier of the encapsulation (operation 420). The gateway determines one or more egress inter-switch ports associated with a multicast tree (operation 422). In the example in FIG. 3, gateway 102 determines egress ports associated with multicast tree 302. The switch forwards the packet via the determined egress inter-switch ports (operation 424).

Figure 4B:
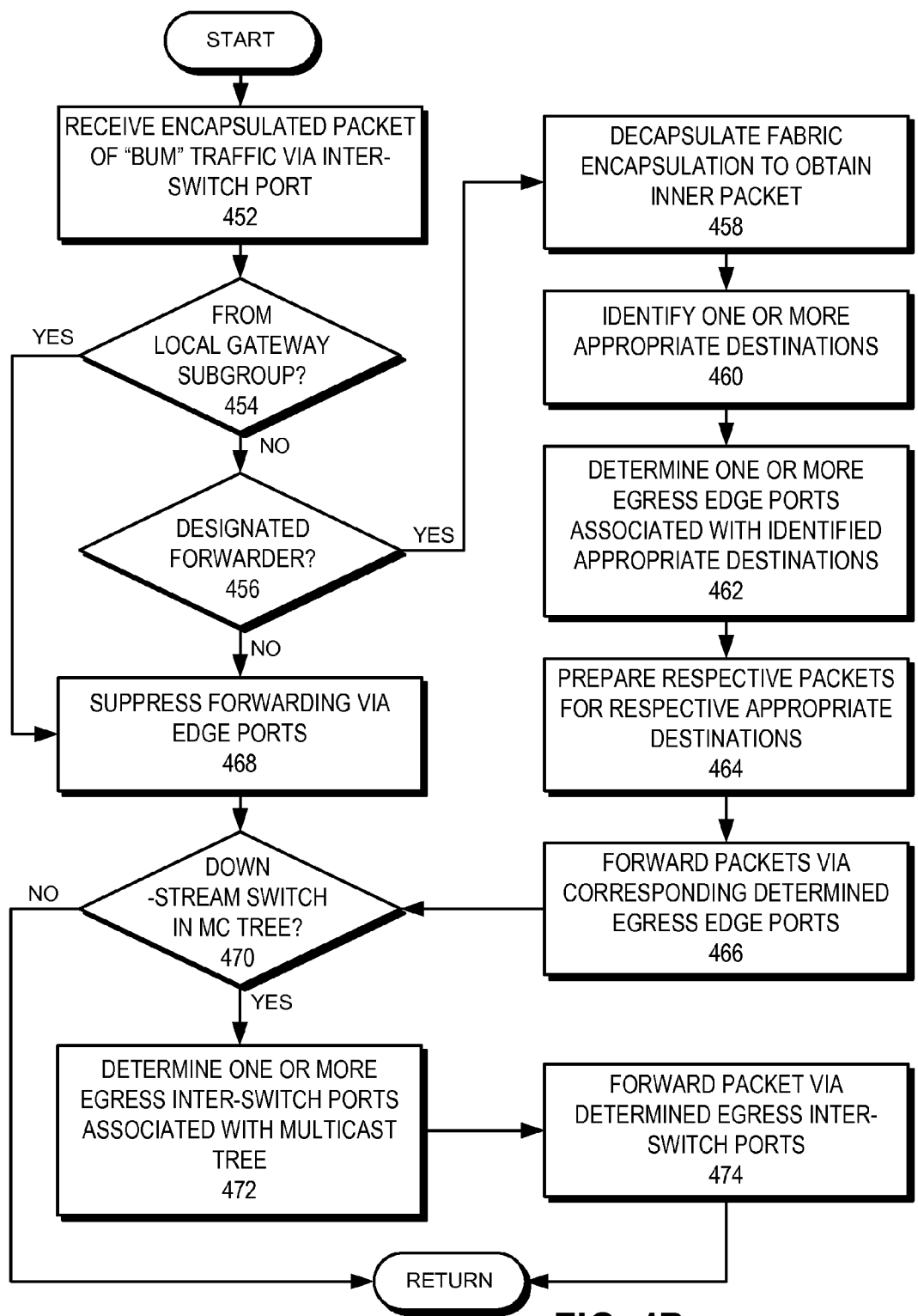
FIG. 4B presents a flowchart illustrating the process of a gateway in a gateway subgroup forwarding a packet of BUM traffic received via an inter-switch port, in accordance with an embodiment of the present invention.

FIG. 4B presents a flowchart illustrating the process of a gateway in a gateway subgroup forwarding a packet of BUM traffic received via an inter-switch port, in accordance with an embodiment of the present invention. During operation, the gateway receives an encapsulated packet, which can be a fabric-encapsulated packet, of BUM traffic via an inter-switch port (operation 452) and checks whether the packet is from the local gateway subgroup (operation 454). If the packet is not from the local gateway subgroup, the gateway checks whether the local gateway is the designated forwarder for multi-destination packets (operation 456). If the local gateway is the designated forwarder, the gateway decapsulates fabric encapsulation to obtain the inner packet (operation 458). The gateway identifies one or more appropriate destinations (operations 460) and determines one or more edge ports associated with the identified appropriate destinations (operation 462). The gateway then prepares respective packets for respective appropriate destinations (operation 464) and forwards the packets via corresponding determined egress edge ports (operation 466).

If the packet is from the local gateway subgroup or the local gateway is not the designated forwarder, the gateway suppresses forwarding via edge ports (operation 468). The gateway checks whether the gateway has any downstream switch in the multicast tree (operation 470). If the gateway has any downstream switch in the multicast tree, the gateway determines one or more egress inter-switch ports associated with the multicast tree (operation 472) and forwards the packet via the determined egress inter-switch ports (operation 474).

Multiple Gateway Instances

In some embodiments, a fabric switch can represent different gateway instances. A respective gateway instance appears as a gateway to a network external to the fabric switch. Some member switches can operate as one gateway instance while other member switches can operate as another gateway instance. These gateway instances can be for the same or different tunneling protocols. Examples of such a tunneling protocols include, but are not limited to, VXLAN, GRE, and its variations, such as NVGRE and Open vSwitch GRE. Hence, the same fabric switch can operate as a gateway for different tunneling protocols although underlying physical gateways in the fabric switch can be different.

Figure 5A:
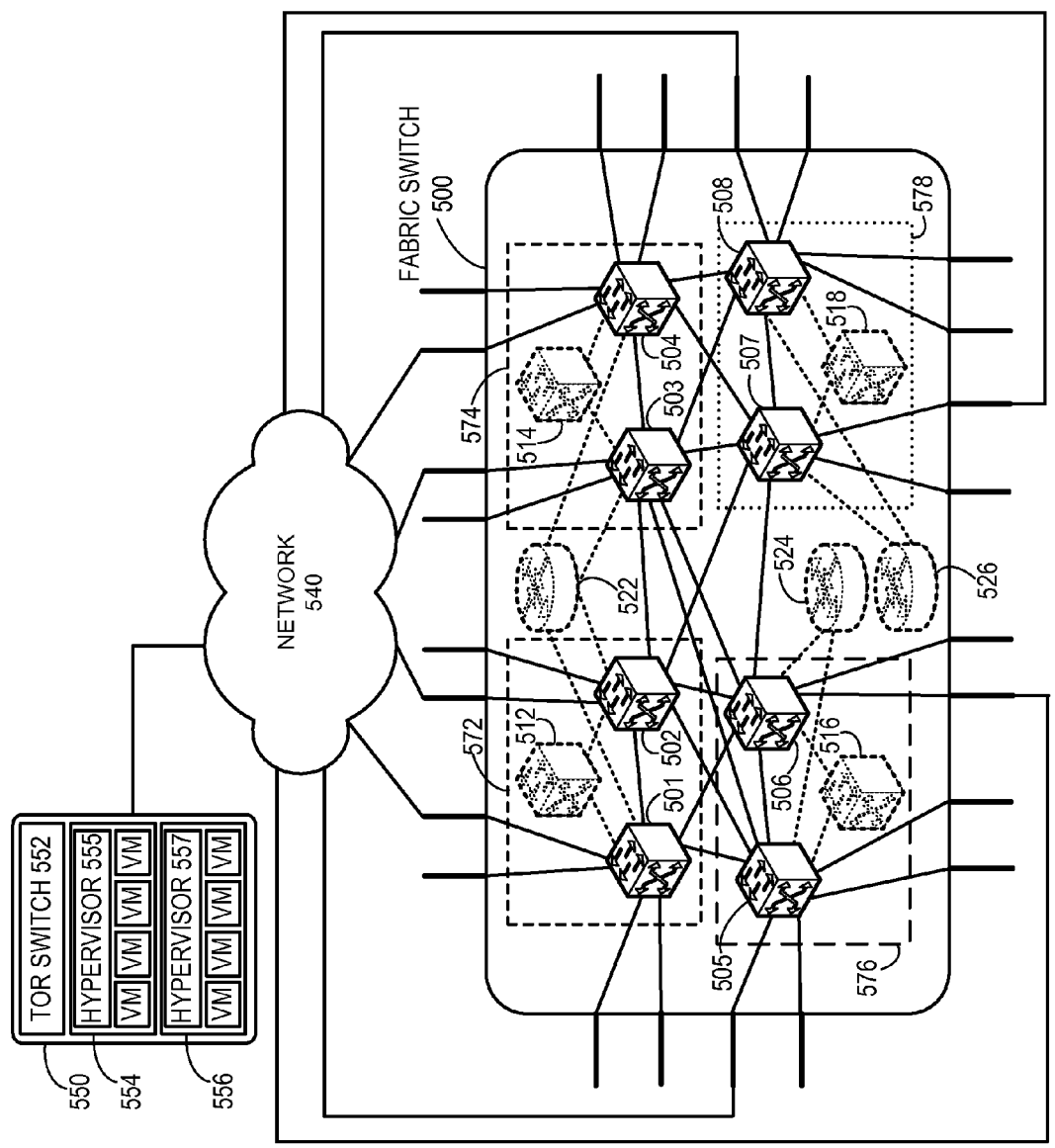
FIG. 5A illustrates an exemplary fabric switch with gateway instances, in accordance with an embodiment of the present invention.

FIG. 5A illustrates an exemplary fabric switch with gateway instances, in accordance with an embodiment of the present invention. As illustrated in FIG. 5A, a fabric switch 500 includes member switches 501, 502, 503, 504, 505, 506, 507, and 508. In some embodiments, fabric switch 500 is a TRILL network and a respective member switch of fabric switch 500, such as switch 501, is a TRILL RBridge. Switches in fabric switch 500 use edge ports to communicate with end devices (e.g., non-member switches) and inter-switch ports to communicate with other member switches. For example, switch 501 is coupled to external network 540 via an edge port and to switches 502, 505, and 506 via inter-switch ports and one or more links. Data communication via an edge port can be based on Ethernet and via an inter-switch port can be based on TRILL protocol. It should be noted that control message exchange via inter-switch ports can be based on a different protocol (e.g., IP or FC protocol).

Server rack 550 includes computing devices 554 and 556, which communicate via switch 552. In some embodiments, switch 552 is a top of the rack (ToR) switch. Virtual machines hosted in computing devices 554 and 556 run on hypervisors 555 and 557, respectively. When a virtual machine generates a packet, that virtual machine provides that packet to its corresponding hypervisor for external communication. When communicating outside of the virtual machine's VLAN boundary, that hypervisor establishes a tunnel with a gateway and forwards that packet using tunnel encapsulation based on a tunneling protocol to the gateway.

Gateways 501 and 502 are grouped into gateway subgroup 572, gateways 503 and 504 are grouped into gateway subgroup 574, gateways 505 and 506 are grouped into gateway subgroup 576, and gateways 507 and 508 are grouped into gateway subgroup 578. In this way, a gateway instance can have a plurality of gateway subgroups (e.g., gateway subgroups 572 and 574 are associated with the same gateway instance). On the other hand, a gateway instance may include at least one gateway subgroup (e.g., gateway subgroups 576 and 578 are associated with respective gateway instances). This ensures that tunnel terminations are distributed across a gateway instance and a respective gateway instance provides "active-active" high availability, as described in conjunction with FIG. 1C.

In some embodiments, a respective gateway subgroup includes a virtual switch and a respective gateway in a gateway subgroup is logically coupled to that virtual switch. For example, gateway subgroup 572 includes virtual switch 512 and gateways 501 and 502 are logically coupled to virtual switch 512 (denoted with dotted lines). Similarly, gateway subgroup 574 includes virtual switch 514 and gateways 503 and 504 are logically coupled to virtual switch 514. Gateway subgroup 576 includes virtual switch 516 and gateways 505 and 506 are logically coupled to virtual switch 516. Gateway subgroup 578 includes virtual switch 518 and gateways 507 and 508 are logically coupled to virtual switch 518. A respective member switch outside of a gateway subgroup considers a virtual switch as another member switch and is coupled to the gateways of the gateway subgroup. As a result, to send a packet toward a gateway subgroup, other member switches send the packet toward the corresponding virtual switch, and one of the gateways eventually receives the packet. In some embodiments, a virtual switch is associated with one or more virtual identifiers.

In this example, fabric switch 500 operates as a gateway for a large number of hypervisors, including hypervisors 555 and 557. However, this gateway can be for different gateway instances. For example, fabric switch 500 is virtualized as virtual gateways 522, 524, and 526 to external network 540 for different gateway instances. A virtual gateway can represent a gateway instance. In some embodiments, virtual gateways 522, 524, and 526 can be associated with respective virtual IP addresses and virtual MAC addresses. To reach virtual gateway 522, 524, or 526, tunnel-encapsulated packets are sent to the corresponding virtual IP address.

Virtual gateway 522 corresponds to a gateway instance and is physically represented by gateway switches 501, 502, 503, and 504 (denoted with dotted lines). Similarly, virtual gateway 524 corresponds to a gateway instance and is physically represented by gateway switches 505 and 506, and virtual gateway 526 corresponds to a gateway instance and is physically represented by gateway switches 507 and 508. A hypervisor, such as hypervisor 555, views the gateways as corresponding virtual gateways 522, 524, and 526, respectively.

In some embodiments, fabric switch 500 can include a plurality of gateway instances based on the same or different tunneling protocols. This allows fabric switch 500 to operate as multiple gateways using the same tunneling protocol. On the other hand, fabric switch 500 can also operate as multiple gateways using different tunneling protocols. The gateway instances of virtual gateways 522 and 524 can be based on the same tunneling protocol, and the gateway instance of virtual gateway 526 can be based on another tunneling protocol. As a result, fabric switch 500 can operate as a gateway for different clients and different vendors. For example, the gateway instances of virtual gateways 522 and 524 can be based on VXLAN, and the gateway instance of virtual gateway 526 can be based on NVGRE. Furthermore, the gateway instance of virtual gateway 522 can be for one client and the gateway instance of virtual gateway 524 can be for another client.

Because a gateway instance can have a plurality of gateway subgroups, a gateway instance can have multiple designated forwarders. As a result, when a gateway broadcasts a multi-destination packet to other member switches of fabric switch 500, multiple designated forwarders can forward the packet and cause packet looping. To solve this problem, only one of the gateways in a gateway instance operates as a designated forwarder and forwards multi-destination packets via its edge ports. Other gateways in the gateway instance suppress forwarding of multi-destination packets via the edge ports.

Figure 5B:
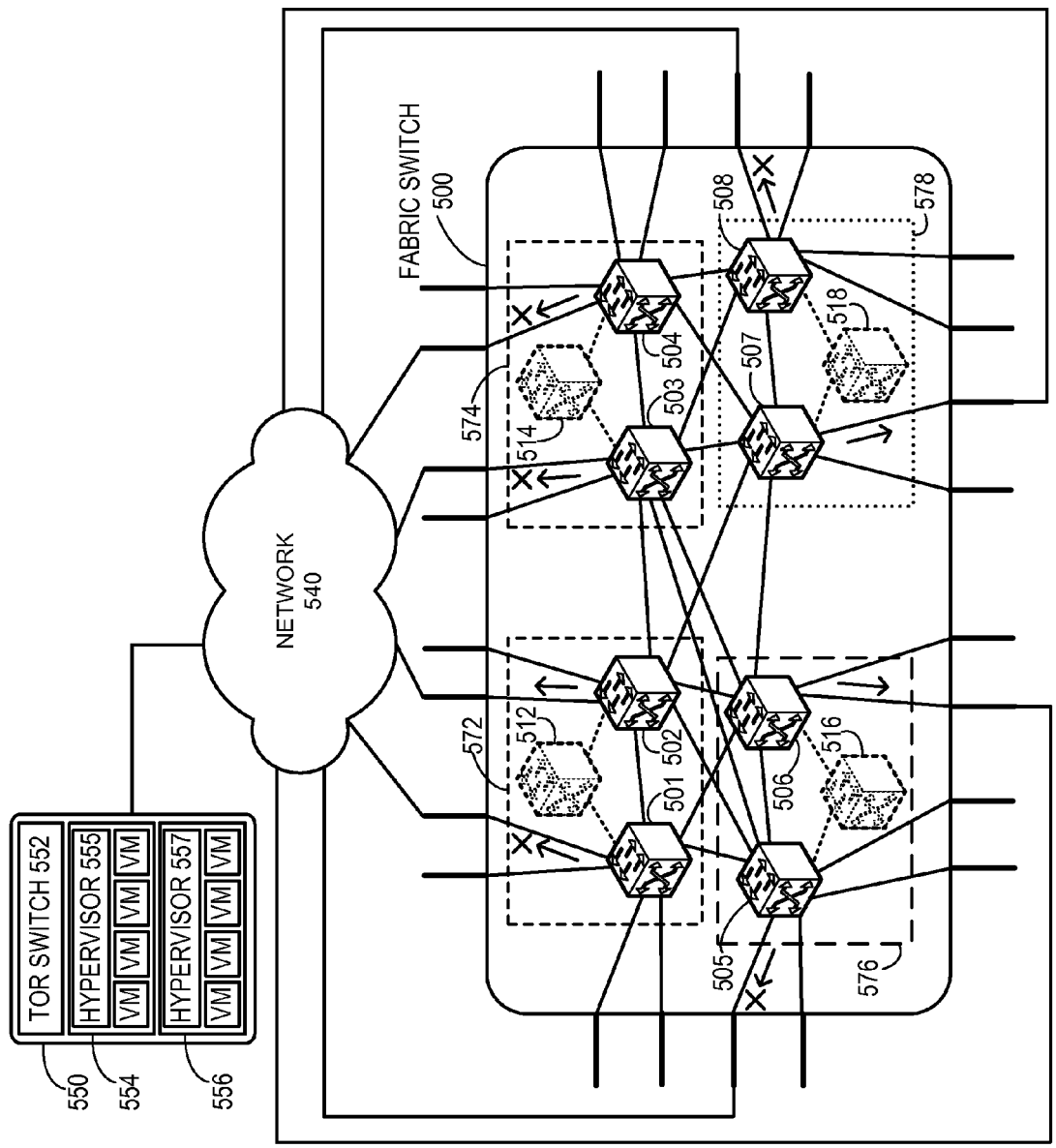
FIG. 5B illustrates an exemplary multi-destination suppression in gateway instances in a fabric switch, in accordance with an embodiment of the present invention.

FIG. 5B illustrates an exemplary multi-destination suppression in gateway instances in a fabric switch, in accordance with an embodiment of the present invention. Suppose that gateway 502 is the designated forwarder for gateway subgroups 572 and 574 (i.e., for the gateway instance of virtual gateway 502). Only gateway 502 in gateway subgroups 572 and 574 forwards multi-destination packets via its edge ports. However, gateway subgroups 576 and 578 are in different gateway instances. As a result, each of gateway subgroups 576 and 578 has a designated forwarder. For example, gateways 506 and 507 can be the designated forwarder for gateway subgroups 576 and 578, respectively.

During operation, gateway 502 of gateway subgroup 572 receives a multi-destination packet. Gateway 502 forwards the packet to appropriate destinations via the local edge ports (denoted with an arrow). For example, gateway 502 can forward the packet via one or more tunnels to hypervisors 555 and 557. Gateway 502 also broadcasts that packet to other member switches of fabric switch 500. Gateway 501 of gateway subgroup 572, and gateways 503 and 504 of gateway subgroup 574, also receive the packet. However, since gateways 501, 503, 504 are not the designated forwarder, gateways 501, 503, and 504 suppress forwarding of multi-destination packets via the edge ports (denoted by an "X").

On the other hand, gateways 505 and 506 of gateway subgroup 576, and gateways 507 and 508 of gateway subgroup 578 receive the packet. Since gateways 506 and 507 are designated forwarders, gateways 506 and 507 forward the packet to appropriate destinations via the local edge ports (denoted with an arrow). For example, gateways 506 and 507 can forward the packet via one or more tunnels toward hypervisors 555 and 557. However, since gateway 505 of gateway subgroup 576 and gateway 508 of gateway subgroup 578 are not the designated forwarder, gateways 505 and 508 suppress forwarding of multi-destination packets via the edge ports (denoted by an "X"). In this way, only one of the gateways in a respective gateway instance forwards multi-destination packets via edge ports.

Figure 6:
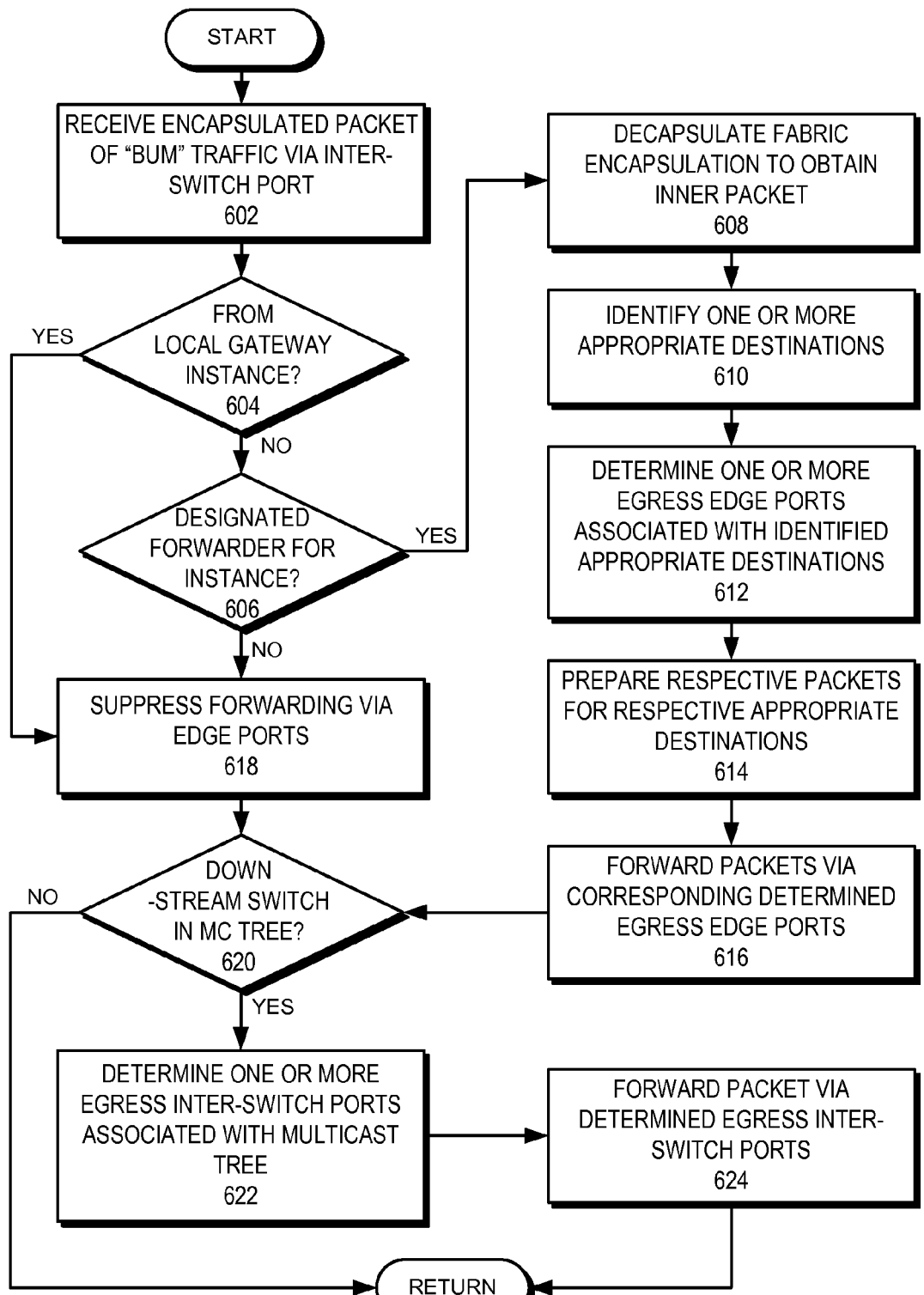
FIG. 6 presents a flowchart illustrating the process of a gateway in a gateway subgroup forwarding a packet of BUM traffic received via an inter-switch port toward gateway instances, in accordance with an embodiment of the present invention.

FIG. 6 presents a flowchart illustrating the process of a gateway in a gateway subgroup forwarding a packet of BUM traffic received via an inter-switch port toward gateway instances, in accordance with an embodiment of the present invention. During operation, the gateway receives an encapsulated packet, which can be a fabric-encapsulated packet, of BUM traffic via an inter-switch port (operation 602) and checks whether the packet is from the local gateway instance (operation 604). If the packet is not from the local gateway instance, the gateway checks whether the local gateway is the designated forwarder for multi-destination packets for the local gateway instance (operation 606). If the local gateway is the designated forwarder, the gateway decapsulates fabric encapsulation to obtain the inner packet (operation 608). The gateway identifies one or more appropriate destinations (operations 610) and determines one or more edge ports associated with the identified appropriate destinations (operation 612). The gateway then prepares respective packets for respective appropriate destinations (operation 614) and forwards the packets via corresponding determined egress edge ports (operation 616).

If the packet is from the local gateway instance or the local gateway is not the designated forwarder, the gateway suppresses forwarding via edge ports (operation 618). In the example in FIG. 5B, upon receiving a multi-destination packet from gateway 502, gateway 503 suppresses forwarding because the packet is from the same gateway instance. On the other hand, upon receiving a multi-destination packet from gateway 502, gateway 505 suppresses forwarding because gateway 505 is not the designated forwarder. The gateway then checks whether the gateway has any downstream switch in the multicast tree (operation 620). If the gateway has any downstream switch in the multicast tree, the gateway determines one or more egress inter-switch ports associated with the multicast tree (operation 622) and forwards the packet via the determined egress inter-switch ports (operation 624).

Exemplary Switch System

Figure 7:
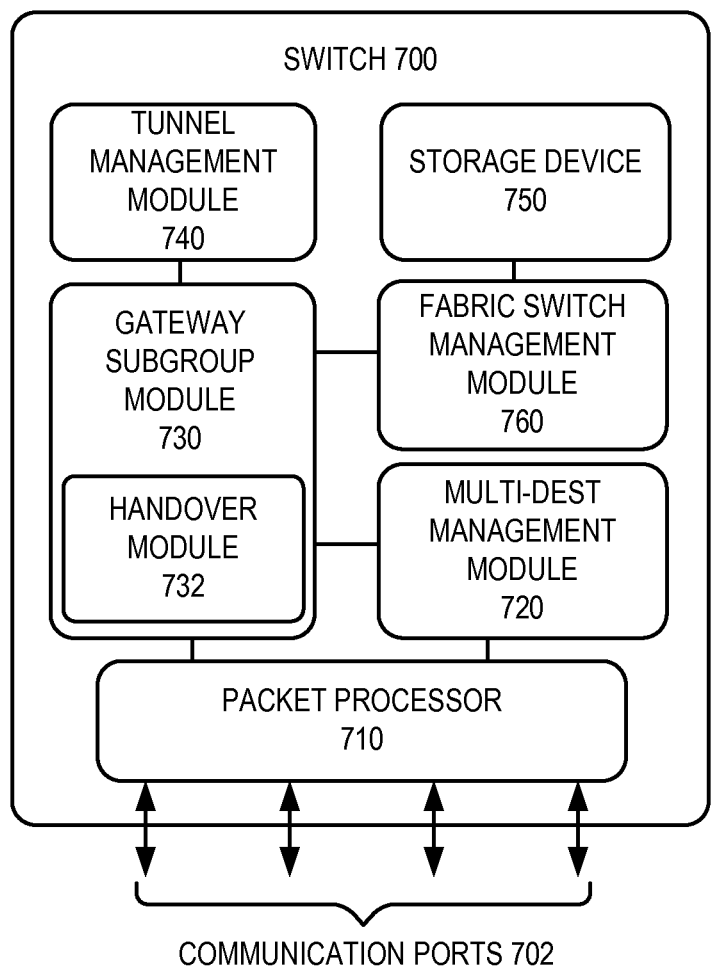
FIG. 7 illustrates an exemplary architecture of a switch with gateway subgroup support, in accordance with an embodiment of the present invention.

FIG. 7 illustrates an exemplary architecture of a switch with gateway subgroup support, in accordance with an embodiment of the present invention. In this example, a switch 700 includes a number of communication ports 702, a packet processor 710, a gateway subgroup module 730, a tunnel management module 740, and a storage device 750. Packet processor 710 extracts and processes header information from the received frames.

In some embodiments, switch 700 may maintain a membership in a fabric switch, as described in conjunction with FIG. 1A, wherein switch 700 also includes a fabric switch management module 760. Fabric switch management module 760 maintains a configuration database in storage device 750 that maintains the configuration state of every switch within the fabric switch. Fabric switch management module 760 maintains the state of the fabric switch, which is used to join other switches. In some embodiments, switch 700 can be configured to operate in conjunction with a remote switch as an Ethernet switch. Under such a scenario, communication ports 702 can include inter-switch communication channels for communication within a fabric switch. This inter-switch communication channel can be implemented via a regular communication port and based on any open or proprietary format. Communication ports 702 can include one or more TRILL ports capable of receiving frames encapsulated in a TRILL header. Packet processor 710 can process these TRILL-encapsulated frames.

During operation, gateway subgroup module 730 operates switch 700 in conjunction with a remote switch to form a gateway subgroup, as described in conjunction with FIG. 1A. Switch 700 and the remote switch actively operate as tunnel gateways. Tunnel management module 740 maintains a data structure, which can be stored in storage device 750, indicating whether a tunnel source subnet is associated with the gateway subgroup. If the tunnel source subnet of the tunnel-encapsulated packet is associated with the gateway subgroup, packet processor 710 decapsulates a tunnel-encapsulated packet, which can be received via one of the communication ports 702. Otherwise, tunnel management module 740 is precluded from decapsulating the tunnel-encapsulated packet. In some embodiments, switch 700 also includes a handover module which determines an egress port corresponding to a gateway switch of a different gateway subgroup.

In some embodiments, packet processor 710 identifies a virtual switch identifier, which is associated with a virtual switch, in a packet as a local identifier, as described in conjunction with FIG. 1A. Packet processor 710 can also decapsulate tunnel encapsulation of the tunnel-encapsulated packet, which can be further encapsulated in a second encapsulation. In some embodiments, switch 700 also includes a multi-destination management module 720 which operates switch 700 as a designated forwarder of the gateway subgroup or of a gateway instance. Switch 700 and the remote switch can operate as a virtual gateway for the gateway instance, as described in conjunction with FIG. 5A.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method for facilitating scalable tunnel gateways in a fabric switch. In one embodiment, the switch includes a gateway subgroup module, a tunnel management module, and a packet processor. The gateway subgroup module operates the switch in conjunction with a remote switch to form a gateway subgroup. The switch and the remote switch actively operate as tunnel gateways. The tunnel management module maintains a data structure indicating whether a tunnel source subnet is associated with the gateway subgroup. The packet processor decapsulates a tunnel-encapsulated packet in response to a tunnel source subnet of the tunnel-encapsulated packet being associated with the gateway subgroup.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
gateway subgroup circuitry configured to operate the switch in conjunction with a remote switch to form a gateway subgroup, wherein the switch and the remote switch actively operate as tunnel gateways;
tunnel management circuitry configured to maintain a data structure indicating whether a tunnel source subnet is associated with the gateway subgroup; and
packet processing circuitry configured to:
decapsulate a tunnel-encapsulated packet in response to a tunnel source subnet of the tunnel-encapsulated packet being associated with the gateway subgroup; and refrain from decapsulating the tunnel-encapsulated packet in response to the tunnel source subnet of the tunnel-encapsulated packet not being associated with the gateway subgroup.

2. The switch of claim 1, further comprising handover circuitry configured to determine an egress port corresponding to a gateway switch, wherein the gateway switch is in a second gateway subgroup associated with the tunnel source subnet of the tunnel-encapsulated packet.

3. The switch of claim 1, wherein the switch and the remote switch operate as a virtual gateway, wherein a tunnel destination of the tunnel-encapsulated packet is assigned to the virtual gateway.

4. The switch of claim 1, wherein the packet processing circuitry is further configured to identify a virtual switch identifier in a packet as a local identifier assigned to the switch, wherein the virtual switch identifier is associated with a virtual switch.

5. The switch of claim 1, wherein the packet processing circuitry is further configured to decapsulate a tunnel encapsulation header of the tunnel-encapsulated packet, wherein the tunnel-encapsulated packet is further encapsulated in a second encapsulation header.

6. The switch of claim 1, further comprising multi-destination management circuitry configured to operate the switch as a designated forwarder of the gateway subgroup, wherein a designated forwarder forwards a multi-destination packet via edge ports of a switch.

7. The switch of claim 1, further comprising multi-destination management circuitry configured to operate the switch as a designated forwarder of a gateway instance, wherein a gateway instance represents a gateway, and wherein a gateway instance includes one or more gateway subgroups.

8. The switch of claim 7, wherein the switch and the remote switch operate as a virtual gateway for the gateway instance, wherein a gateway instance is associated with a virtual gateway.

9. The switch of claim 1, further comprising fabric switch management circuitry configured to maintain a membership in a network of interconnected switches, wherein the network of interconnected switches is controlled as a single logical switch.

10. The switch of claim 1, wherein the packet processing circuitry is further configured to continue to decapsulate a tunnel-encapsulated packet in response to determining that the remote switch is unavailable, wherein a tunnel source subnet of the tunnel-encapsulated packet being associated with the gateway subgroup.

11. A computer-executable method, comprising:
operating a switch in conjunction with a remote switch to form a gateway subgroup, wherein the switch and the remote switch actively operate as tunnel gateways;
maintaining a data structure indicating whether a tunnel source subnet is associated with the gateway subgroup;
decapsulating a tunnel-encapsulated packet in response to a tunnel source subnet of the tunnel-encapsulated packet being associated with the gateway subgroup; and
refraining from decapsulating the tunnel-encapsulated packet in response to the tunnel source subnet of the tunnel-encapsulated packet not being associated with the gateway subgroup.

12. The method of claim 11, further comprising determining an egress port corresponding to a gateway switch, wherein the gateway switch is in a second gateway subgroup associated with the tunnel source subnet of the tunnel-encapsulated packet.

13. The method of claim 11, wherein the switch and the remote switch operate as a virtual gateway, wherein a tunnel destination of the tunnel-encapsulated packet is assigned to the virtual gateway.

14. The method of claim 11, further comprising identifying a virtual switch identifier in a packet as a local identifier assigned to the switch, wherein the virtual switch identifier is associated with a virtual switch.

15. The method of claim 11, further comprising decapsulating a tunnel encapsulation header of the tunnel-encapsulated packet, wherein the tunnel-encapsulated packet is further encapsulated in a second encapsulation header.

16. The method of claim 11, further comprising operating the switch as a designated forwarder of the gateway subgroup, wherein a designated forwarder forwards a multi-destination packet via edge ports of a switch.

17. The method of claim 11, further comprising operating the switch as a designated forwarder of a gateway instance, wherein a gateway instance represents a gateway, and wherein a gateway instance includes one or more gateway subgroups.

18. The method of claim 17, wherein the switch and the remote switch operate as a virtual gateway for the gateway instance, wherein a gateway instance is associated with a virtual gateway.

19. The method of claim 11, maintaining a membership in a network of interconnected switches, wherein the network of interconnected switches is controlled as a single logical switch.

20. The method of claim 11, further comprising continuing to decapsulate a tunnel-encapsulated packet in response to determining that the remote switch is unavailable, wherein a tunnel source subnet of the tunnel-encapsulated packet being associated with the gateway subgroup.

21. A non-transitory computer-readable storage medium storing instructions which when executed by a computer cause the computer to perform a method, the method comprising:
operating a switch in conjunction with a remote switch to form a gateway subgroup, wherein the switch and the remote switch actively operate as tunnel gateways;
maintaining a data structure indicating whether a tunnel source subnet is associated with the gateway subgroup;
decapsulating a tunnel-encapsulated packet in response to a tunnel source subnet of the tunnel-encapsulated packet being associated with the gateway subgroup; and
refraining from decapsulating the tunnel-encapsulated packet in response to the tunnel source subnet of the tunnel-encapsulated packet not being associated with the gateway subgroup.

22. The non-transitory computer-readable storage medium of claim 21, wherein the method further comprises determining an egress port corresponding to a gateway switch, wherein the gateway switch is in a second gateway subgroup associated with the tunnel source subnet of the tunnel-encapsulated packet.

23. The non-transitory computer-readable storage medium of claim 21, wherein the method further comprises operating the switch as a designated forwarder of the gateway subgroup, wherein a designated forwarder forwards a multi-destination packet via edge ports of a switch.

24. The non-transitory computer-readable storage medium of claim 21, wherein the method further comprises operating the switch as a designated forwarder of a gateway instance, wherein a gateway instance represents a gateway, and wherein a gateway instance includes one or more gateway subgroups.

25. The non-transitory computer-readable storage medium of claim 21, wherein the method further comprises continuing to decapsulate a tunnel-encapsulated packet in response to determining that the remote switch is unavailable, wherein a tunnel source subnet of the tunnel-encapsulated packet being associated with the gateway subgroup.

\* \* \* \* \*